Figures 1, 2:
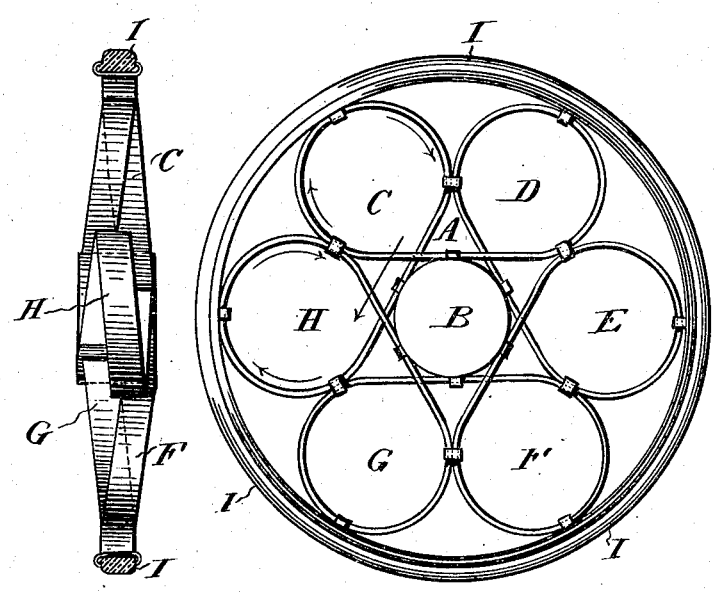

E. MURRAY.
SPRING VEHICLE WHEEL.
APPLICATION FILED FEB. 27, 1908.

939,432.

Patented Nov. 9, 1909.

Witnesses

Inventor
Esther Murray
by B. Singer
Attorney

UNITED STATES PATENT OFFICE.

ESTHER MURRAY, OF GLASGOW, SCOTLAND.

SPRING VEHICLE-WHEEL.

939,432.

Specification of Letters Patent.   Patented Nov. 9, 1909.

Application filed February 27, 1908.   Serial No. 418,159.   REISSUED

*To all whom it may concern:*

Be it known that I, ESTHER MURRAY, of 5 Clifton Place, Sauchishall street west, in the city and county of Glasgow, Scotland, lecturer on anatomy, have invented certain new and useful Spring Vehicle-Wheels, of which the following is a specification.

This invention which relates to the road wheels of cycles, motors, and other vehicles, of the type in which the resiliency of the wheel depends principally or entirely upon the interposition of a spring or springs between the hub or inner rim, and the rim carrying the tire or tread, has for its object the provision of a spring of such form that the greatest resiliency is imparted to the wheel while the necessary rigidity or driving power in the direction of drive is maintained, and also when traveling to the rear.

In order that my invention may be properly understood and readily carried into effect, I have hereunto appended one sheet of drawings, of which—

Figure 1 is a side elevation of a vehicle wheel made in accordance with and embodying my invention. Fig. 2 is an end elevation of the same with the tire and rim in section.

In building up the wheel according to my improvements and with reference to Figs. 1 and 2, I take a continuous strip A of hard flexible metal such as steel, of convenient breadth, and secure it preferably to the one side of the hub B, and thence from it unto a loop C of circular formation returning with the strip A which is secured again to the hub at an opposite point. This operation is repeated thus forming a number of loops arranged zig-zag and consisting as shown in the drawings of six, C, D, E, F, G, H, although a less or greater number could be employed. In this form of wheel the loops or the crossing portions of the strip are arranged out of alinement.

Claims.

1. In a spring vehicle wheel, the combination with a hub and a rim, of a continuous one piece strip of yielding material supportingly interposed between the hub and the rim, said strip being bent to form a plurality of circular loops arranged in abutting relation with respect to each other and with respect to the rim and out of engagement with the hub, means connecting said loops with each other at engaging points thereof, and means connecting said loops with said rim at engaging points of the loops therewith, said strip being provided with a plurality of straight sections connecting adjacent loops and lying tangentially against the hub with the straight sections crossing each other, and means connecting said straight connections with the hub at the point of engagement therewith.

2. In a spring vehicle wheel, the combination with a hub and a rim, of a continuous one piece strip of yielding material supportingly interposed between the hub and the rim, said strip being bent to form a plurality of circular loops, means connecting said loops with each other, and means connecting said loops with said rim, said strip being provided with straight sections connecting adjacent loops, and means connecting said straight sections with said hub.

In witness whereof I have hereunto set my hand in the presence of two witnesses.

ESTHER MURRAY.

Witnesses:
JOHN LIDDLE,
JOHN T. LIDDLE.